(12) United States Patent
Levy (10) Patent No.: US 9,429,956 B1
(45) Date of Patent: Aug. 30, 2016

(54) MODULAR CHECK VALVE SYSTEM

(71) Applicant: PETROTECHNOLOGIES, INC., Broussard, LA (US)

(72) Inventor: David Baer Levy, Broussard, LA (US)

(73) Assignee: PETROTECHNOLOGIES, INC, Broussard, LA (US)

( * ) Notice: Subject to any disclaimer, the term of this patent is extended or adjusted under 35 U.S.C. 154(b) by 0 days.

(21) Appl. No.: 15/132,539

(22) Filed: Apr. 19, 2016

(51) Int. Cl.
*F16K 15/06* (2006.01)
*G05D 7/01* (2006.01)
(Continued)

(52) U.S. Cl.
CPC ............... *G05D 7/014* (2013.01); *F16K 15/00* (2013.01); *F16K 15/02* (2013.01); *F16K 15/06* (2013.01); *F16K 15/063* (2013.01); *F16K 15/066* (2013.01); *G05D 7/0126* (2013.01); *G05D 7/0133* (2013.01); *G05D 7/0146* (2013.01); *G05D 7/0153* (2013.01); *Y10T 137/2934* (2015.04); *Y10T 137/6086* (2015.04); *Y10T 137/7841* (2015.04); *Y10T 137/7846* (2015.04); *Y10T 137/7854* (2015.04); *Y10T 137/7856* (2015.04); *Y10T 137/7866* (2015.04); *Y10T 137/7922* (2015.04); *Y10T 137/7925* (2015.04); *Y10T 137/7929* (2015.04); *Y10T 137/7932* (2015.04); *Y10T 137/7933* (2015.04); *Y10T 137/7934* (2015.04); *Y10T 137/7935* (2015.04); *Y10T 137/7936* (2015.04)

(58) Field of Classification Search
CPC ........ F16K 15/00; F16K 15/02; F16K 15/06; F16K 15/063; F16K 15/066; G05D 7/0126; G05D 7/0133; G05D 7/014; G05D 7/0146; G05D 7/0153; Y10T 34/2934; Y10T 37/6086; Y10T 137/7738; Y10T 137/7838; Y10T 137/7839; Y10T 137/7841; Y10T 13/7846; Y10T 137/7848; Y10T 137/7854; Y10T 137/7856; Y10T 137/7857; Y10T 137/7866; Y10T 137/7867; Y10T 137/7922; Y10T 137/7925; Y10T 137/7929; Y10T 137/7932; Y10T 137/7933; Y10T 137/7934; Y10T 137/7935; Y10T 137/7936
USPC ................ 137/155, 315.33, 469, 512, 512.1, 137/512.2, 512.3, 513, 513.5, 515, 515.3, 137/515.5, 515.7, 516.25, 516.27, 535, 538, 137/540, 542, 543, 543.13, 543.15, 543.17
See application file for complete search history.

(56) References Cited

U.S. PATENT DOCUMENTS

2,075,293 A * 3/1937 Larkin .................... E21B 21/10
                                                         137/169
3,584,900 A    6/1971 Lennon et al.
3,752,507 A    8/1973 Maurer et al.
(Continued)

*Primary Examiner* — William McCalister
*Assistant Examiner* — Ian Paquette
(74) *Attorney, Agent, or Firm* — Buskop Law Group, PC; Wendy Buskop (57) ABSTRACT

A modular check valve system for providing back pressure to a fluid flow having a housing with a seating end, a receiving end, a housing annulus, and a housing sealing surface. The modular check valve system can also have at least one cartridge insert fluidly connected to the housing. The cartridge insert can have a poppet engaging a cartridge housing sealing surface, a pair of O-rings positioned on the cartridge housing, and a rod secured to the poppet. The rod is configured to move the poppet from a sealed position to an open position. A spring guide with spring is disposed around the rod. A compression adjustment device is connected to the first rod opposite the spring guide to apply force to the rod sealing the poppet against the cartridge housing sealing surface and creating fluid back pressure in the housing annulus when the spring is decompressed.

17 Claims, 4 Drawing Sheets

(51) Int. Cl.
*F16K 15/00* (2006.01)
*F16K 15/02* (2006.01)

(56) References Cited

U.S. PATENT DOCUMENTS

| | | | |
|---|---|---|---|
| 3,987,663 A | 10/1976 | Repella | |
| 4,712,619 A * | 12/1987 | Stepp | E21B 21/10 137/515 |
| 5,148,828 A * | 9/1992 | Farnham | E03C 1/106 137/454.6 |
| 5,295,392 A | 3/1994 | Hensel et al. | |
| 5,509,727 A | 4/1996 | Hart et al. | |
| 5,833,490 A | 11/1998 | Bouldin | |
| 6,056,327 A | 5/2000 | Bouldin et al. | |
| 6,178,998 B1 * | 1/2001 | Ochiai | E03C 1/106 137/115.16 |
| 6,269,683 B1 | 8/2001 | Jackson | |
| 6,851,728 B2 | 2/2005 | Minami | |
| 6,981,422 B1 | 1/2006 | Comardo | |
| 7,219,736 B1 | 5/2007 | Levy | |
| 7,614,447 B2 | 11/2009 | Jennings | |
| 7,784,838 B2 | 8/2010 | Levy | |
| 8,037,933 B1 | 10/2011 | Levy | |
| 8,078,412 B2 | 12/2011 | Levy | |
| 8,078,413 B2 | 12/2011 | Levy | |
| 8,230,875 B2 * | 7/2012 | Norman | F16K 15/063 137/315.33 |
| 8,408,295 B1 | 4/2013 | Levy | |
| 8,650,934 B1 | 2/2014 | Levy | |
| 9,031,789 B2 | 5/2015 | Levy | |
| 2004/0244840 A1 * | 12/2004 | Takeda | F16K 15/063 137/512 |
| 2006/0076062 A1 * | 4/2006 | Andersson | F16K 15/063 137/512 |
| 2007/0096465 A1 | 5/2007 | Hall et al. | |
| 2008/0315582 A1 | 12/2008 | Levy | |

\* cited by examiner

MODULAR CHECK VALVE SYSTEM

FIELD

The present embodiments generally relate to a modular check valve system.

BACKGROUND

A need exists for a compact and cost effective modular check valve system or back pressure system capable of allowing a controlled injection of fluids into an area of greater, lower, or variable pressures.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present apparatus and system in detail, it is to be understood that the apparatus and system are not limited to the particular embodiments and that it can be practiced or carried out in various ways.

Specific structural and functional details disclosed herein are not to be interpreted as limiting, but merely as a basis of the claims and as a representative basis for teaching persons having ordinary skill in the art to variously employ the present invention.

Many industrial applications can require fluids injected at a controlled rate into an area or region that can be of lower or higher pressures than the fluid being injected. In some instances pressures can vary and fluctuate, creating undesirable conditions for fluid injection systems and difficulty in maintaining a controlled rate of injection. One example of such an application is a wellbore for producing oil and gas.

Hydrocarbon fluids such as oil and gas are often produced from subterranean formations by drilling a well to penetrate the hydrocarbon-bearing formation. After drilling, the wells are typically completed with various devices downhole to facilitate the production of the hydrocarbons. Various sensors, pumps, valves, and other equipment are normally included.

Often, there is a need for a chemical injection or dosing system to be installed in a wellbore. Exemplary reasons to inject chemicals can include preventing hydrate formation, paraffin deposition, and corrosion of the infrastructure used to produce fluids.

For example, when fluids from formations come into contact with production equipment in a wellbore or in environmental conditions, such as pressure or temperature change, paraffin or asphaltenes in the formation fluids can precipitate and deposit on production equipment. Over time, deposits may build-up on surfaces of downhole components and impede their function, value, and efficacy.

To address the issues, such as deposit build-up, chemicals may be injected into production tubing to remove, reduce, or inhibit deposited material. For example, a control line may be run from the surface to an injection point to deliver treatment chemicals into a production stream.

Wellbore pressures can vary significantly during production. In instances where wellbore pressure drops below that of a chemical injection or dosing system, chemicals can flow freely and uncontrolled into the wellbore.

Presently, persons having ordinary skill in the art utilize complicated and expensive regulator mechanisms, or make use of "brute force" back pressure equipment.

Many regulatory mechanisms add significant cost to chemical injection systems.

Further, complex systems may be too bulky to fit in a wellbore. Often regulatory systems are subject to a single point of failure.

The present embodiments generally relate to a modular valve system for handling backpressure while for injecting fluids at a controlled dosage.

The system can be implemented in oilfields, refineries, chemical processing plants, steel mills, power plants, onshore or offshore drilling rigs, or any location requiring controlled fluid delivery mechanism.

The system has the benefit of being extremely simple to implement, requiring little to no training of operators. The system is intuitive and designed in a manner to allow for modular implementation, which can be customized for a wide range of applications and back pressure requirements.

The system can be implemented on equipment subject to a range of temperatures, pressures, mechanical stresses, gravitational forces, or otherwise harsh conditions. Current pieces of equipment already in the field can be readily and inexpensively modified to utilize this system.

The system for providing back pressure to a fluid flow can have a plurality of modular cartridges. Each modular cartridge of the plurality of modular cartridges can have a housing, a spring, an annulus for allowing fluid flow, and a seal for applying back pressure to the annulus.

In embodiments, the housing of the modular cartridge can have a seating end and a receiving end. The receiving end can be configured to receive the seating end of another cartridge. In embodiments, the seating end and the receiving end can be shaped differently to allow for visually discerning the orientation of the modular cartridge.

For example, the seating end of one modular cartridge can be tapered and the receiving end can be configured to receive the seating end of another modular cartridge. The modular cartridges can be fastened together using any means known in the art, such as threaded connections, pipe fittings, clamps, and the like. In embodiments, the seating end or the receiving end can be complementarily threaded to attach to one another.

The modular cartridges need not be connected directly to one another. For example, a run of pipe can be inserted between the modular cartridges as space or applications require. A sealing means for ensuring a fluid tight connection between the modular cartridges can also be employed.

In embodiments, the sealing means can incorporate O-rings (as well as variations such as x-rings, q-rings)

retaining balls, washers, gaskets, packing, epoxies, barrier coatings, and the like. Persons having ordinary skill in the art can choose appropriate sealing means based upon the application of the system and the environment the system will be required to operate in.

The system can also have a spring, such as a spring, a hydraulic fluid, or a pneumatic fluid. In embodiments, a spring, such as a spring in conjunction with a bias retainer securing the spring can be used to apply back pressure to a seal. A fluid injection system can be used to counteract the spring, thus allowing fluid to flow through an annulus in the housing.

In embodiments, the hydraulic or pneumatic systems can be used as a spring. In embodiments, the spring can have a seal pressure adjustment. Employing such a system with an external control system can allow for adjustment of back pressure provided by the modular cartridges. Mechanical means, such as a screw for adjusting spring tension can also be employed.

In embodiments, the seal assembly of the insert can comprise a poppet, a rod and a ball. The rod can be selectively extended when the force of the spring is overcome.

In embodiments, by using hydraulic or pneumatic means to position a lock piston, a lock body can also have a port for fluid flow in communication with a fluid supply, and a sealed area to contain fluid. The lock piston can further contain at least one piston shoulder to allow the fluid to act on and position the lock piston.

The term "poppet" as used herein can refer to a part of a check valve that both creates a seal and transmits force to hold back pressure.

The term "back pressure" as used herein can refer to a resistance to fluid flow.

The term "elastomeric seal" as used herein for the poppet can refer to a metal part that captures and uses an elastomer, such as an O-ring, to seal. While O-rings are referenced as commonly known structures made from elastomers, it should be noted that other equivalent seals comprising metal can be substituted therefor.

The term "top sub" as used herein can refer to an upstream portion of a check valve body that encloses a portion of the part to which it is connected.

The term "expanded cartridge" as used herein can refer to a check body with the ability to connect to other check valve housings or valve bodies.

The term "spring guide" as used herein can refer to a part designed to keep a spring straight during compression.

The term "exit sub" as used herein can refer to the last check valve body in a group of check bodies.

The term "sub annulus" as used herein can refer to an area of fluid flow through a check valve housing.

Figure 1:
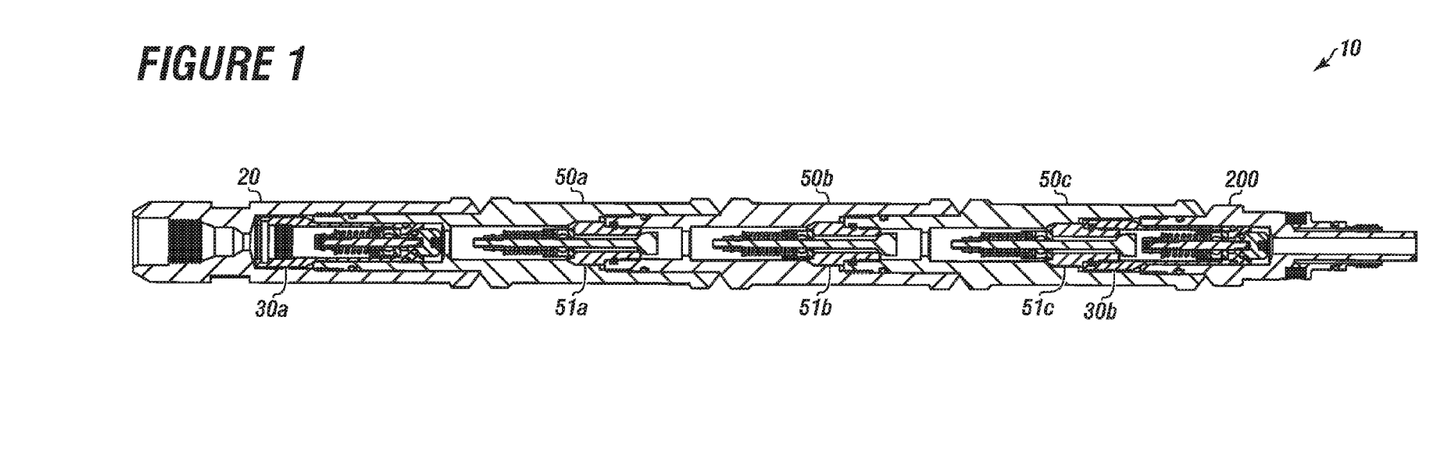
FIG. 1 depicts a cross section of a modular check valve system according to one or more embodiments.

Turning now to the Figures, FIG. 1 depicts a cross section of a modular check valve system according to one or more embodiments.

The modular check valve system 10 can have a housing 20. In embodiments, a first cartridge housing 30a can be fluidly connected to the housing 20. The housing 20 can vary in length from 4 inches to 12 inches and can have an inner diameter ranging from 0.5 inches to 1 inch. In embodiments, the housing 20 can be made from steel, a high nickel alloy, or a suitable material capable of sustaining pressures from atmospheric to 20,000 psi without deforming.

In embodiments, the first cartridge housing 30a can cause a pressure drop in fluid passing through the modular check valve system 10 so that at least one cartridge insert 51a, 51b, and 51c can operate at a lower pressure and reduce stress on the seal.

In embodiments, an expanded cartridge housing 50a can be connected to the first cartridge housing 30a. The expanded cartridge housing 50a can have a length from 4 inches to 12 inches and an inner diameter ranging from 0.25 inches to 2 inches. In embodiments, the expanded cartridge housing 50a can be made from steel, a high nickel alloy, or a suitable material capable of sustaining pressures from atmospheric to 20,000 psi without deforming.

In embodiments, additional expanded cartridge housings 50b and 50c can be connected in series to the expanded cartridge housing 50a. In embodiments, from 2 expanded cartridge housings to 15 expanded cartridge housings can be connected together.

In embodiments, at least one cartridge insert 51a-51c can be installed in each expanded cartridge housing. A second cartridge housing 30b can be connected to the expanded cartridge housing. In embodiments, the second cartridge housing can be identical to the first cartridge housing.

In embodiments, an exit sub 200 can be fluidly engaged between one of the expanded cartridge housings and the second cartridge housing 30b. The exit sub can have a length from 4 inches to 12 inches and an inner diameter ranging from 0.25 inches to 2 inches. The exit sub 200 can be made from steel, a high nickel alloy, or a suitable material capable of sustaining pressures between atmospheric and 20,000 psi without deforming.

Figure 2:
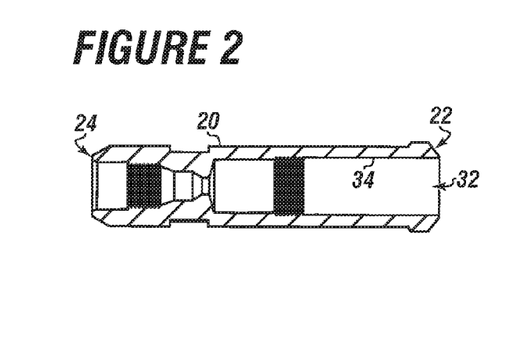
FIG. 2 depicts a cross section of a housing according to one or more embodiments.

FIG. 2 depicts a cross section of a housing according to one or more embodiments.

The housing 20 can have a seating end 22, a receiving end 24, a housing annulus 32 and a housing sealing surface 34.

Figure 3:
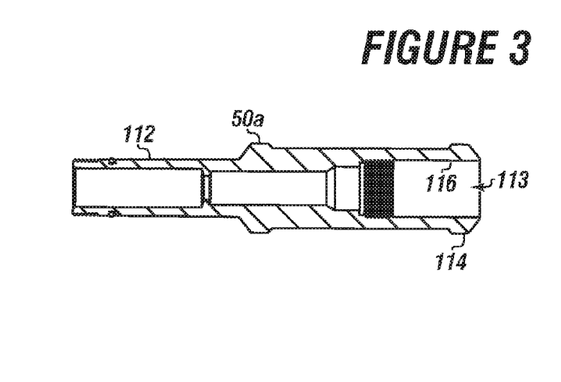
FIG. 3 depicts a cross section of an expanded cartridge housing according to one or more embodiments.

FIG. 3 depicts a cross section of an expanded cartridge housing according to one or more embodiments.

The first expanded cartridge housing 50a can fluidly connect to either the cartridge housing.

In embodiments, the first expanded cartridge housing 50a can have a top sub 112 on one end and an expanded cartridge receiving end 114 on the other end. An expanded cartridge housing annulus 113 can be between the top sub 112 and the expanded cartridge receiving end 114. In embodiments, the first expanded cartridge housing 50a can have an expanded cartridge sealing surface 116.

When the expanded cartridge housing uses a top sub, the top sub can be from 25 percent to 75 percent the total length of the cartridge housing.

Figure 4A:
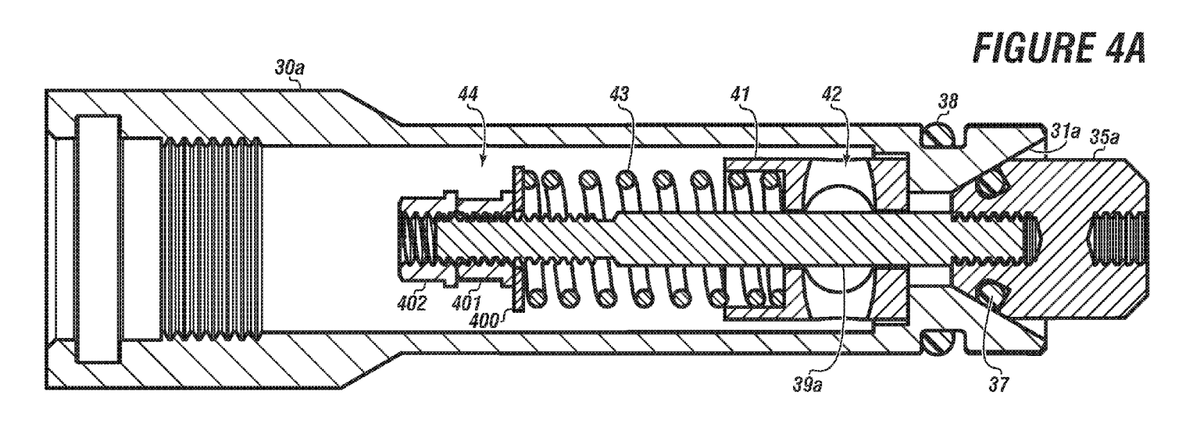
FIGS. 4A and 4B depict a cross section of a cartridge housing according to one or more embodiments.
Figure 4B:
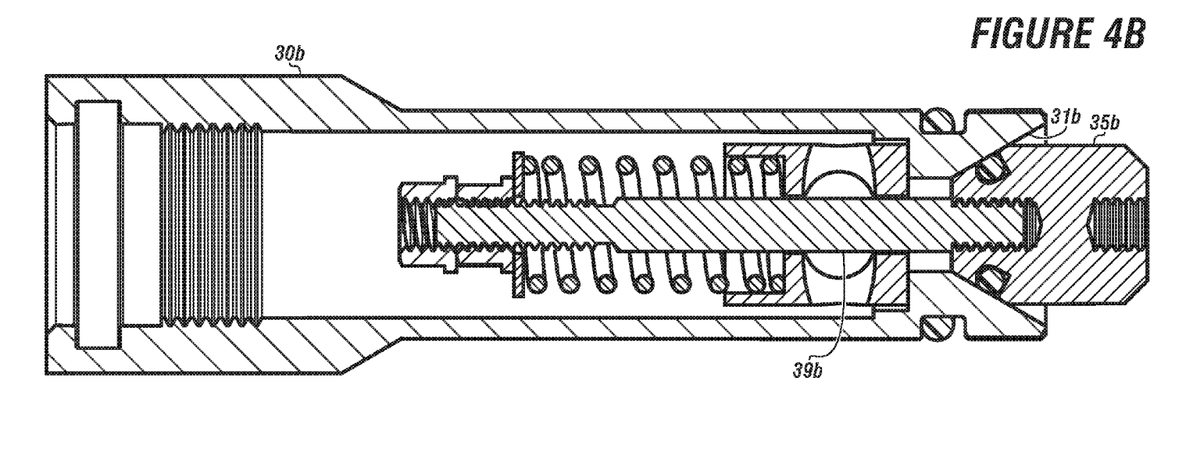

FIGS. 4A and 4B depict a cross section of a cartridge housing according to one or more embodiments.

The first cartridge housing 30a can be fluidly connected to the housing 20, which is not shown in these Figures.

In embodiments, the first cartridge housing 30a can have a first poppet 35a, which can engage a first cartridge housing sealing surface 31a. A first O-ring 37 can be used to form a seal between the first cartridge housing sealing surface 31a and the first poppet 35a. The first O-ring can be elastomeric and have a diameter from 0.25 inches to 3 inches.

In embodiments, a second O-ring 38 can form a seal between the first cartridge housing 30a and the housing 20, which is not shown in this Figure. The second O-ring can be elastomeric and have a diameter from 0.375 inches to 2.0 inches.

In embodiments, a first rod 39a can be secured to the first poppet 35a. In embodiments, the first rod can be solid and can be made from metal. The first rod can be configured to move the first poppet 35a from a sealed position against the first cartridge housing sealing surface 31a to an open position. The first rod can move from 0.05 inches to 0.1 inches.

In embodiments, a second cartridge housing 30b can be fluidly connected to the expanded cartridge housing.

In embodiments, the second cartridge housing 30b can have a second poppet 35b for engaging a second cartridge housing sealing surface 31b and a second rod 39b secured to the second poppet 35b, wherein the second rod 39b can be configured to move the second poppet 35b from a sealed position against the second cartridge housing sealing surface 31b to an open position; and In embodiments, a spring guide 41 can be mounted around the first rod 39a and can have a fluid conduit 42, which can enable fluid to flow from the housing annulus past the first poppet 35a. A spring 43 can be supported by the spring guide 41 and disposed around the first rod 39a.

In embodiments, the spring can be a 1 inch spring. In embodiments, the spring can have 12 helical turns. In embodiments, the spring can be made from a non-corroding alloy.

In embodiments, a compression adjustment device 44 can be connected to the first rod 39 opposite the spring guide 41. The compression adjustment device 44 can apply force to the first rod 39a sealing the first poppet 35a against the first cartridge housing sealing surface 31a and creating fluid back pressure in the housing annulus when the spring 43 is decompressed. Fluid can flow past the first poppet from the housing annulus when the spring is compressed.

In embodiments, the compression adjustment device 44 can include a washer 400 secured over the first rod for supporting a first nut 401 mounted to the first rod. The first nut can be for tension adjustment of the spring to set a cracking pressure of the poppet. A second nut 402 can be mounted to the first rod adjacent the first nut. The second nut can be for locking the first nut in place once the desired cracking pressure is set.

Figure 5A:
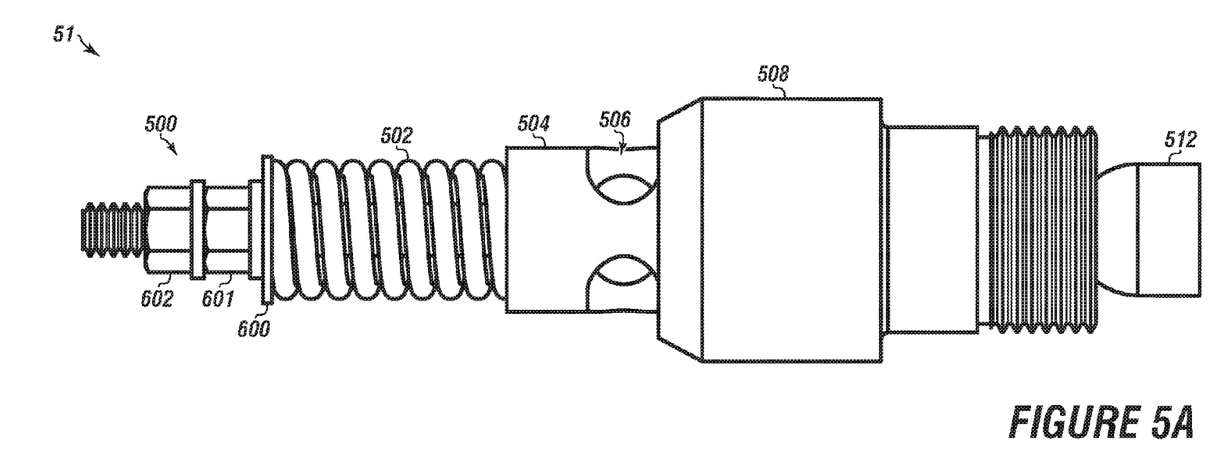
FIGS. 5A and 5B depict a perspective view and a cross section of a cartridge insert according to one or more embodiments.
Figure 5B:
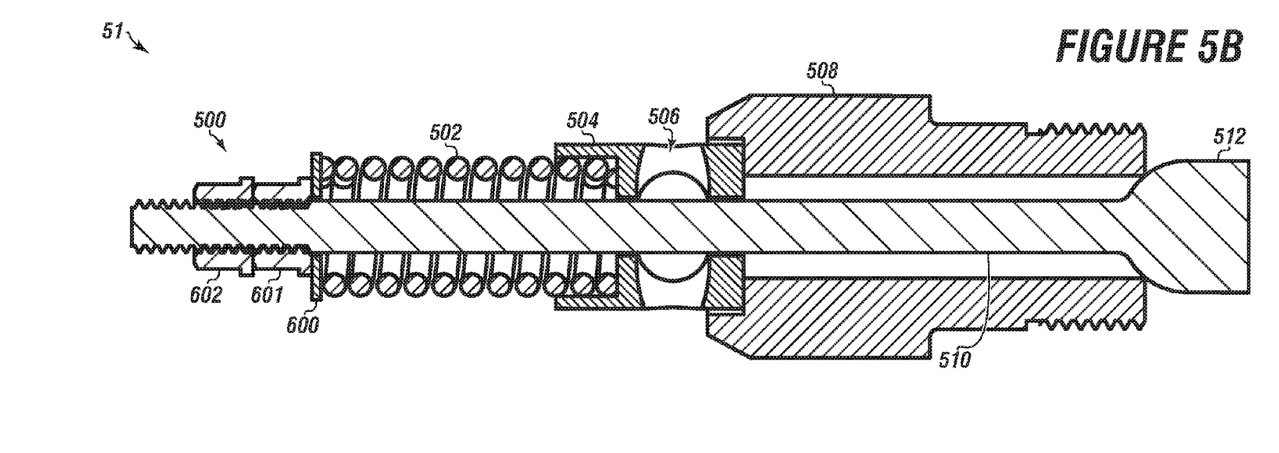

FIGS. 5A and 5B depict a perspective view and a cross section of at least one cartridge insert according to one or more embodiments.

In embodiments, at least one cartridge insert 51 can have a cartridge insert spring guide 504 having a cartridge insert fluid conduit 506. The cartridge insert 51 can have a cartridge insert body 508, which can engage the cartridge insert spring guide 504.

In embodiments, the cartridge insert 51 can have a cartridge insert poppet 512 sealingly engaging the cartridge insert body 508. The cartridge insert poppet 512 can have a different shape than the first poppet 35.

In embodiments, the cartridge insert poppet 512 can be made from the same material as the first poppet. The first poppet and the cartridge insert poppet can each be from 1 inch to 3 inches in length and thick enough to seal against the respective sealing surface.

In embodiments, the cartridge insert poppet 512 can be secured to a cartridge insert rod 510. The cartridge insert rod 510 can be inserted longitudinally through the cartridge insert body 508.

The cartridge insert 51 can have a cartridge insert spring 502, which can be supported by the cartridge insert spring guide 504. The cartridge insert spring 502 can be configured to move the cartridge insert poppet 512 between a sealed position against the cartridge insert body and an open position.

The cartridge insert 51 can have a cartridge insert compression adjustment device 500 connected to the cartridge insert rod 510. The cartridge insert compression adjustment device can apply force to the cartridge insert poppet 512 to seal against the cartridge insert body 508 creating fluid back pressure in the expanded cartridge housing annulus when the cartridge insert spring 502 is decompressed. The cartridge insert compression adjustment device 500 can enable fluid to flow past the cartridge insert poppet 512 from the expanded cartridge housing annulus when the cartridge insert spring is compressed. In embodiments, the fluid back pressure can range from 20 psi to 2000 psi.

In embodiments, the cartridge insert compression adjustment device 500 can include a cartridge insert washer 600 secured over the cartridge insert rod 510 for supporting a first cartridge insert nut 601 mounted to the cartridge insert rod 510. The first cartridge insert nut can be for tension adjustment of the cartridge insert spring 502 to set a cracking pressure of the cartridge insert poppet 512. A second cartridge insert nut 602 can be mounted to the cartridge insert rod adjacent the first cartridge insert nut. The second cartridge insert nut can be for locking the first cartridge insert nut in place once the desired cracking pressure is set.

Figure 6:
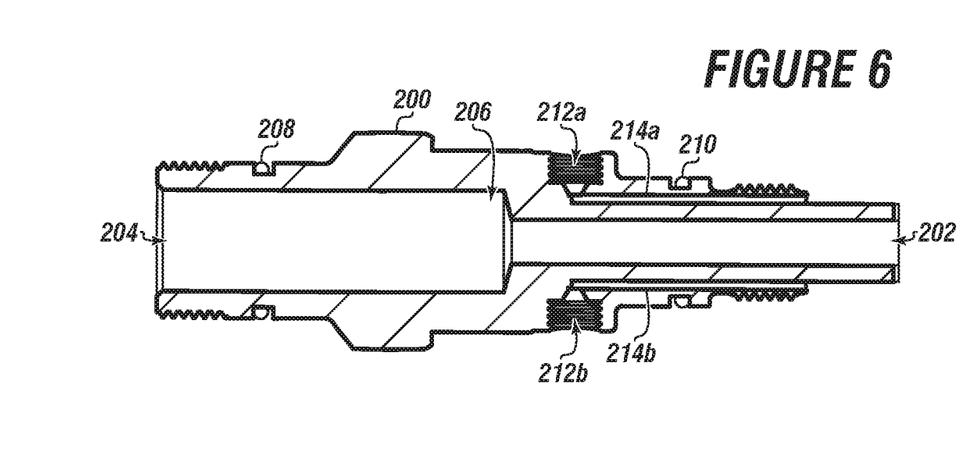
FIG. 6 depicts an exit sub according to one or more embodiments.

FIG. 6 depicts an exit sub according to one or more embodiments.

In embodiments, the exit sub 200 can have an exit 202 and an entrance 204. In embodiments, the exit sub can have a smooth fit.

A sub annulus 206 can extend between the exit 202 and the entrance 204 and can fluidly engage the expanded cartridge housing.

In embodiments, the exit sub can have a plurality of test ports 212a, 212b. Each test port can have a test conduit 214a, 214b respectively. The test ports can be used to test the system at pressures ranging from 200 psi to 20,000 psi.

In embodiments, the exit sub can further have a test O-ring 208 for sealing the exit sub during fluid testing of the modular check valve system. At least one test port can be used to test the seals of the system.

In embodiments, the exit sub can have an exit sub O-ring 210, which can form a seal with a bottom hole assembly or another downhole tool to which the modular check valve system can be attached, the exit sub O-ring 210 can enable fluid testing of the modular check valve system as attached to a bottom hole assembly or other down hole tool without the need for an additional testing device.

In embodiments, a plurality of cartridge inserts can act simultaneously and in the same direction when the modular check valve system is operated.

In embodiments, a total resistance of the modular check valve system can be reduced or expanded by fluidly connecting additional expanded cartridge housings with cartridge inserts to existing cartridge housings with cartridge inserts.

In embodiments, the first poppet, the cartridge insert poppet, or both the first poppet and the cartridge insert poppet can form an elastomeric seal or a metal to metal seal.

In embodiments, the first rod can form a threadable engagement with the poppet and the compression adjustment device.

In embodiments, the cartridge insert rod can form a threadable engagement with the cartridge insert adjustment device and an integral non-removable non-moving connection with the cartridge insert poppet.

In embodiments, the housing and the expanded cartridge housing can have substantially identical outer diameters.

In embodiments, assembly of the modular check valve system can include the following steps or methods of assembling.

In embodiments, the assembly of the modular check valve system can include determining the required total required pressure drop, for example 1,000 psi for the modular check valve system.

In embodiments, the assembly of the modular check valve system can include adjusting the compression adjustment device of the first cartridge housing to achieve a pressure drop of 50 psi. The 50 psi cracking pressure value applies minimal stress to the elastomer seal surface created by the O-ring.

In embodiments, the assembly of the modular check valve system can include configuring each cartridge insert connected in sequence to the housing to crack at 300 psi.

In embodiments, the assembly of the modular check valve system can include adjusting the cartridge insert compression adjustment device of the second cartridge housing to achieve a pressure drop of 50 psi. The 50 psi cracking pressure value applies minimal stress to the elastomer seal surface created by the O-ring.

In embodiments, the assembly of the modular check valve system can include connecting the housing with the first cartridge housing.

In embodiments, the assembly of the modular check valve system can include connecting the expanded cartridge housing to the first cartridge housing.

In embodiments, the assembly of the modular check valve system can include connecting additional expanded cartridge housings to the expanded cartridge housing if specifications for the job require this step.

In embodiments, the assembly of the modular check valve system can include connecting a second cartridge housing to the expanded cartridge housing.

In embodiments, the assembly of the modular check valve system can include connecting the exit sub to the second cartridge housing.

In embodiments, the assembly of the modular check valve system end result will be a 1,000 psi pressure drop when flowing fluid through the modular check valve system with the energy being dissipated among five pressure drop locations.

While these embodiments have been described with emphasis on the structure, it should be understood that within the scope of the appended claims, the invention can be implemented other than as specifically described herein.

What is claimed is:

1. A modular check valve system for providing back pressure to a fluid flow downhole comprising:
   a. a housing;
   b. a first cartridge housing fluidly connected to the housing, the first cartridge housing comprising:
      (i) a first poppet engaging a first cartridge housing sealing surface; and
      (ii) a first rod secured to the first poppet, the first rod configured to move the first poppet from a sealed position against the first cartridge housing sealing surface to an open position;
   c. an expanded cartridge housing fluidly connected to the first cartridge housing, the expanded cartridge housing comprising an expanded cartridge housing annulus;
   d. at least one cartridge insert installed in the expanded cartridge housing, the at least one cartridge insert comprising a cartridge insert poppet sealingly engaging a cartridge insert body, the cartridge insert poppet secured to a cartridge insert rod, the cartridge insert rod inserted longitudinally through the cartridge insert body and configured to move the cartridge insert poppet between a sealed position against the cartridge insert body and an open position;
   e. a second cartridge housing fluidly connected to the expanded cartridge housing, the second cartridge housing comprising:
      (i) a second poppet engaging a second cartridge housing sealing surface; and
      (ii) a second rod secured to the second poppet, the second rod configured to move the second poppet from a sealed position against the second cartridge housing sealing surface to an open position; and
   f. an exit sub fluidly engaging the expanded cartridge housing and the second cartridge housing, the exit sub comprising a sub annulus extending between an exit and an entrance.

2. The modular check valve system of claim 1, wherein the exit sub comprises a plurality of test ports, each test port of the plurality of test ports having a test conduit and the exit sub further having a test O-ring for sealing the exit sub during fluid testing of the modular check valve system.

3. The modular check valve system of claim 1, comprising an exit sub O-ring around the exit sub forming a seal with a bottom hole assembly or a downhole tool to which the modular check valve system is attached, the exit sub O-ring enabling fluid testing of the modular check valve system as attached to the bottom hole assembly or the downhole tool without the need for an additional testing device.

4. The modular check valve system of claim 1, wherein the first cartridge housing comprises:
   a. a first O-ring forming a seal between the first cartridge housing sealing surface and the first poppet; and
   b. a second O-ring forming a seal between the first cartridge housing and the housing.

5. The modular check valve system of claim 1, wherein the expanded cartridge housing comprises:
   a. a top sub;
   b. an expanded cartridge receiving end; and
   c. an expanded cartridge sealing surface.

6. The modular check valve system of claim 1, wherein the at least one cartridge insert comprises a plurality of cartridge inserts which act simultaneously and in the same direction when the modular check valve system is operated.

7. The modular check valve system of claim 1, wherein a total resistance of the modular check valve system can be reduced or expanded by fluidly connecting additional expanded cartridge housings with at least one cartridge insert to the existing cartridge housing with the at least one cartridge insert.

8. The modular check valve system of claim 1, wherein at least one of: the first poppet, the second poppet, or both the first poppet and the second poppet form an elastomeric seal or a metal to metal seal.

9. The modular check valve system of claim 1, wherein the cartridge insert poppet forms a metal to metal seal.

10. The modular check valve system of claim 1, wherein the housing and the expanded cartridge housing have substantially identical outer diameters.

11. The modular check valve system of claim 1, wherein the housing comprises a seating end, a receiving end, a housing annulus and a housing sealing surface.

12. The modular check valve system of claim 1, wherein the first cartridge housing comprises a spring guide mounted around the first rod having a fluid conduit for flowing fluid from the housing annulus around the first poppet, a spring supported by the spring guide and disposed around the first rod, a compression adjustment device connected to the first rod opposite the spring guide, the compression adjustment device applying force to the first rod sealing the first poppet against the first cartridge housing sealing surface creating fluid back pressure in the housing annulus when the spring is decompressed and fluid flow past the first poppet from the housing annulus when the spring is compressed.

13. The modular check valve system of claim 12, wherein the compression adjustment device comprises:
   a. a washer secured over the first rod for supporting a first nut mounted to the first rod, the first nut for tension adjustment of the spring to set a cracking pressure of the first poppet; and
   b. a second nut mounted to the first rod adjacent the first nut, the second nut for locking the first nut in place once a desired cracking pressure is set.

14. The modular check valve system of claim 12, wherein the first rod forms a threadable engagement with the first poppet and the compression adjustment device.

15. The modular check valve system of claim 1, wherein the at least one cartridge insert comprises:
   a. a cartridge insert spring guide having a cartridge insert fluid conduit;
   b. the cartridge insert body engaging the cartridge insert spring guide;
   c. a cartridge insert spring supported by the cartridge insert spring guide; and
   d. a cartridge insert compression adjustment device connected to the cartridge insert rod, the cartridge insert compression adjustment device applying force to the cartridge insert poppet to seal against the cartridge insert body creating fluid back pressure in the expanded cartridge housing annulus when the cartridge insert spring is decompressed and fluid flow past the cartridge insert poppet from the expanded cartridge housing annulus when the cartridge insert spring is compressed.

16. The modular check valve system of claim 15, wherein the cartridge insert compression adjustment device comprises:
   a. a cartridge insert washer secured over the cartridge insert rod for supporting a first cartridge insert nut mounted to the cartridge insert rod, the first cartridge insert nut for tension adjustment of the cartridge insert spring to set a cracking pressure of the cartridge insert poppet; and
   b. a second cartridge insert nut mounted to the cartridge insert rod adjacent the first cartridge insert nut, the second cartridge insert nut for locking the first cartridge insert nut in place once the desired cracking pressure is set.

17. The modular check valve system of claim 15, wherein the cartridge insert rod forms a threadable engagement with the cartridge insert compression adjustment device and an integral non-removable non-moving connection with the cartridge insert poppet.

* * * * *